(12) United States Patent
Hilicus, Sr.

(10) Patent No.: US 7,101,262 B2
(45) Date of Patent: Sep. 5, 2006

(54) APPARATUS AND METHODS FOR TEXTURIZING TREAD SURFACES OF TIRES

(76) Inventor: Herbert C. Hilicus, Sr., 505 Chiswell Rd., Schenectady, NY (US) 12304

( * ) Notice: Subject to any disclaimer, the term of this patent is extended or adjusted under 35 U.S.C. 154(b) by 82 days.

(21) Appl. No.: 10/706,579

(22) Filed: Nov. 12, 2003

(65) Prior Publication Data

US 2005/0098271 A1    May 12, 2005

(51) Int. Cl.
*B24B 1/00* (2006.01)
*B24B 41/00* (2006.01)

(52) U.S. Cl. .................. 451/49; 451/340; 451/360; 83/951

(58) Field of Classification Search .............. 157/13; 83/951; 241/DIG. 31; 451/49, 340, 360
See application file for complete search history.

(56) References Cited

U.S. PATENT DOCUMENTS

| 2,995,183 | A | * | 8/1961 | Love | 157/13 |
|---|---|---|---|---|---|
| 3,595,295 | A | * | 7/1971 | Curry | 157/13 |
| 3,763,914 | A | * | 10/1973 | Vance | 157/13 |
| 3,867,792 | A | | 2/1975 | Pelletier | 51/33 W |
| 3,905,160 | A | | 9/1975 | McKenney | 51/106 R |
| 3,909,337 | A | | 9/1975 | Yabe | 156/416 |
| 4,036,677 | A | * | 7/1977 | Marangoni | 156/421.6 |
| 4,126,171 | A | * | 11/1978 | Sorenson | 157/13 |
| 4,207,727 | A | | 6/1980 | Poytress | 56/330 |
| 4,306,607 | A | * | 12/1981 | Curry | 157/13 |
| 4,515,200 | A | * | 5/1985 | Williams | 157/13 |
| 4,825,926 | A | * | 5/1989 | Crommelynck et al. | 157/13 |
| 4,873,759 | A | * | 10/1989 | Burch | 29/700 |
| 5,033,175 | A | * | 7/1991 | Jensen | 407/29.12 |
| 5,185,960 | A | | 2/1993 | Majerus et al. | 51/104 |
| 5,247,983 | A | | 9/1993 | Inez | 157/13 |
| 5,307,854 | A | * | 5/1994 | Brewer | 157/13 |
| 5,768,764 | A | * | 6/1998 | Batt | 29/700 |
| 6,178,814 | B1 | | 1/2001 | Curtis | 73/146 |
| 6,251,204 | B1 | | 6/2001 | Andersson et al. | 156/96 |
| 2002/0166642 | A1 | | 11/2002 | Trochon | 157/13 |
| 2003/0110912 | A1 | | 6/2003 | English et al. | 83/420 |

* cited by examiner

*Primary Examiner*—Lee D. Wilson
*Assistant Examiner*—Alvin J. Grant
(74) *Attorney, Agent, or Firm*—Heslin Rothenberg Farley & Mesiti P.C.

(57) ABSTRACT

An apparatus may include a stand, a tire mount supported by the stand and releasably attachable to a tire, a tire rasp, and a tire rasp mount attachable to the tire rasp. The tire rasp mount includes a pair of handles. A four bar support pivotally attaches the tire rasp mount to the stand using hime joints. A motor operably rotates the tire and the tire rasp in opposite directions. An operator can manually move the tire rasp into contact with the tire and apply pressure between the tire rasp and the tire to texturize tread surfaces of the tire. A method is also disclosed which includes forming slices and grooves into the tread surfaces of the tire while maintaining the thickness of the tread. The slices and grooves may extend circumferentially around portions of the tread surfaces of the tire, and about ⅟₃₂-inch to about ⅟₁₆-inch deep.

34 Claims, 5 Drawing Sheets

APPARATUS AND METHODS FOR TEXTURIZING TREAD SURFACES OF TIRES

FIELD OF THE INVENTION

This invention relates generally to tires, and more specifically, to apparatus and methods for texturizing tread surfaces of tires.

BACKGROUND OF THE INVENTION

In dirt track racing, the tires of the cars need to heat up before they achieve maximum traction. Currently, the surfaces of the tires are manually ground using a body grinder to produce circular texturized patterns in the tread surfaces of the tires in an effort to increase tire traction. Manually grinding tires takes up to about 25 minutes per tire and the increased traction resulting from the texturized surface of the tires lasts only about 5 laps.

There is a need for apparatus and methods for texturizing tread surfaces of tires.

SUMMARY OF THE INVENTION

In one aspect, the present invention provides an apparatus for use by an operator for texturizing tread surfaces of a tire. The apparatus includes a stand, a tire mount supported by the stand and releasably attachable to the tire, a tire rasp, and a tire rasp mount attachable to the tire rasp. A support is provided for pivotally attaching the tire rasp mount to the stand, and a driver is operably connected to the tire mount and to the tire rasp for rotating the tire and the tire rasp. The operator is able to manually move the tire rasp into contact with the tire and apply pressure between the tire rasp and the tire to texturize tread surfaces of the tire.

In another aspect, the present invention provides a manually operated portable apparatus for use by an operator to texturize tread surfaces of a tire. The apparatus includes a stand, a tire mount supported by the stand and releasably attachable to the tire, a texturizing hub, and a hub mount attachable to the texturizing hub. The hub mount also includes a pair of handles. A support is provided for attaching the hub mount to the stand. The support includes a plurality of bars, each of the bars being pivotally attached at one end to the stand and pivotally attached at the other end to the hub mount. A driver is operably connected to the tire mount and to the texturizing hub for rotating the tire and the texturizing hub. The operator is able to grab the plurality of handles and manually move the texturizing hub into contact with the tire and apply pressure between the texturizing hub and the tire to texturize tread surfaces of the tire.

In another aspect, the present invention provides a manually operated portable apparatus for use by an operator to texturize tread surfaces of a tire. The apparatus includes a stand, a tire mount supported by the stand for supporting the tire about a horizontally-disposed axis of rotation, a texturizing hub, and a hub mount for rotatably supporting the texturizing hub about a horizontally-disposed axis of rotation. The hub mount includes a pair of vertically-extending handles. A support is provided for attaching the hub mount to the stand. The support includes a plurality of bars, each of the bars being pivotally attached at one end to the hub mount and pivotally attached at the other end to the stand. A driver is operably attached to the tire mount and to the texturizing hub for rotating the tire and the texturizing hub. The handles are disposed at waist height and the operator is able to grab the pair of handles and manually move the texturizing hub into contact with the tire and apply pressure between the texturizing hub and the tire to texturize tread surfaces of the tire.

In a still another aspect, the present invention provides an apparatus for use by an operator for texturizing tread surfaces of a tire. The apparatus includes a stand, tire mount means supported by the stand for supporting the tire, texturizing means for at least one of slicing and gouging, hub mount means for rotatably supporting the texturizing means, support means for pivotally attaching the texturizing means to the stand so that the texturizing means is movable toward and away from the tread surfaces of the tire, across the tread surfaces of the tire, and around edges of the tread surfaces of the tire, and driver means operably connected to the tire mount means and to the texturizing means for rotating the tire and the texturizing means.

In a yet further aspects, the present invention provides methods for texturizing tread surfaces of a tire which includes providing the apparatus noted above and operating the apparatus to form a plurality of at least one of slices and grooves circumferentially around portions of the tread surfaces of the tire.

In still yet another aspect, the present invention provides a method for texturizing tread surfaces of a tire in which the method includes forming a plurality of at least one of slices and grooves into the tread surfaces of the tire while maintaining the thickness of the tread. The plurality of at least one of slices and grooves may extend circumferentially around portions of the tread surfaces of the tire, and about $\frac{1}{32}$-inch to about $\frac{1}{16}$-inch deep.

BRIEF DESCRIPTION OF THE DRAWINGS

The subject matter which is regarded as the invention is particularly pointed out and distinctly claimed in the concluding portion of the specification. The invention, however, may best be understood by reference to the following detailed description of various embodiments and the accompanying drawings in which:

DETAILED DESCRIPTION OF THE INVENTION

Figure 1:
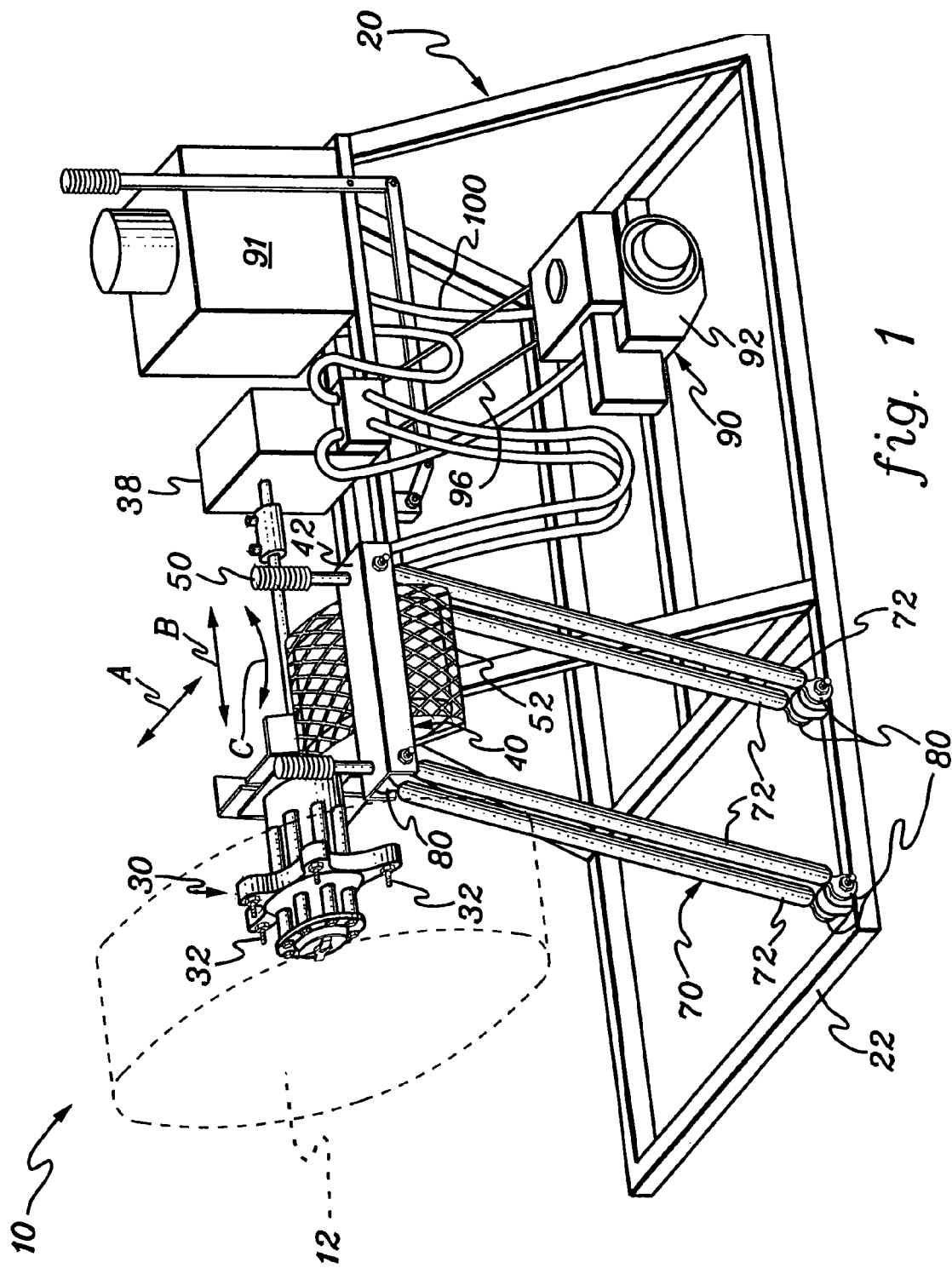
FIG. 1 is a perspective view of one embodiment of an apparatus for texturizing tread surfaces of tires in accordance with the present invention.

FIG. 1 illustrates one embodiment of an apparatus 10 in accordance with the present invention for use by an operator for texturizing tread surfaces of tires. The apparatus may be manually operated and portable so that the apparatus may be transported to a site such as a race track and used for texturizing the tread surfaces of tires prior to the race.

The apparatus, and methods which are described in greater detail below, for texturizing tread surfaces of tires may be used for texturizing tires for dirt track racing, e.g., tires not for street use which have thin lightweight sidewalls. The apparatus and methods allow texturizing the tread surfaces of the tires in about two minutes and in which the texturized tread surfaces increase traction and last an entire dirt track race, e.g., 30 laps. It will be appreciated by those skilled in the art that the apparatus and methods may be used to texturize tread surfaces of other types of tires, extend the useful life of tires, and allow refurbishment of tires (e.g., highly worn tires) which would otherwise not be usable.

Figure 2:
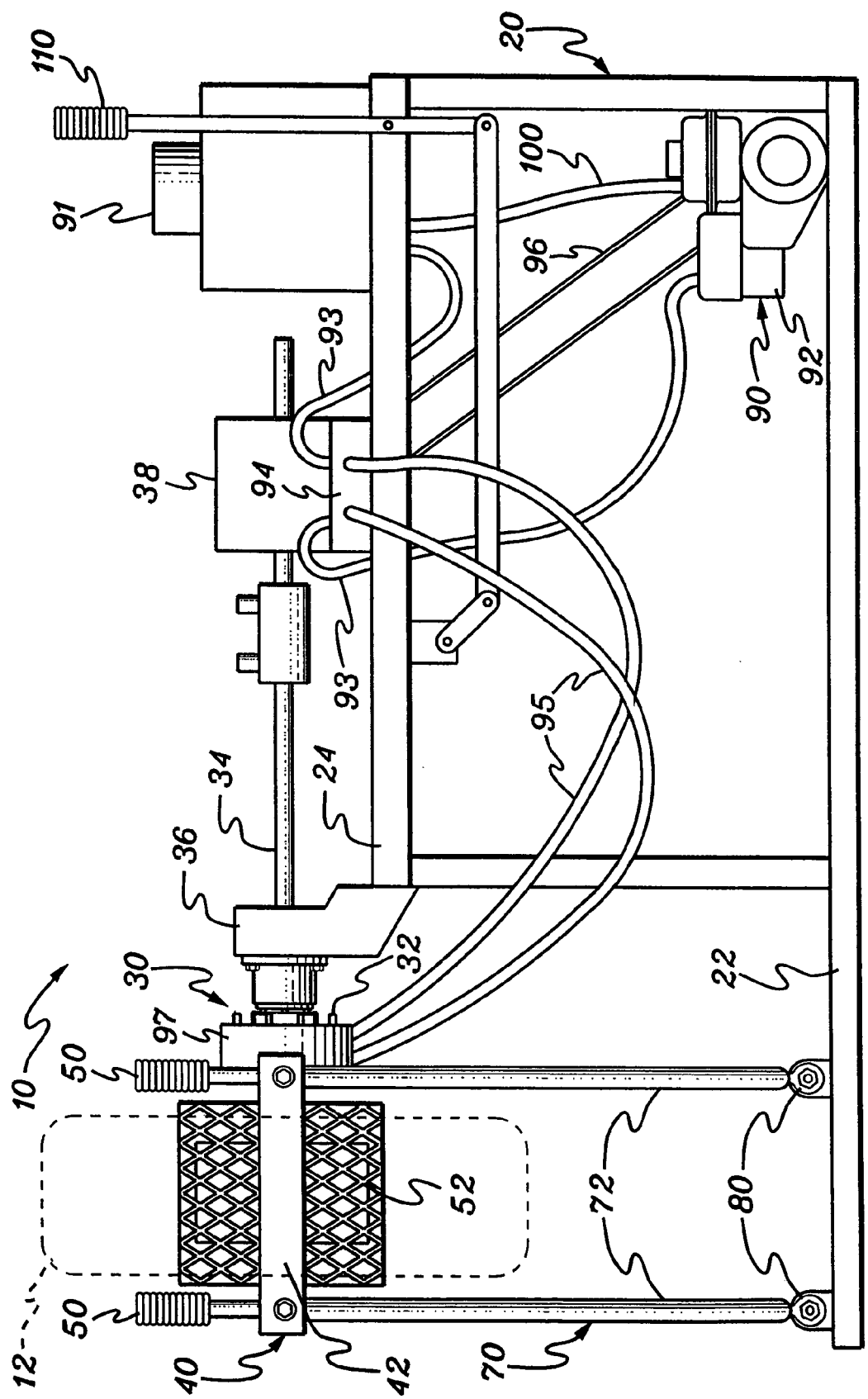
FIG. 2 is a front elevational view of the apparatus of FIG. 1.
Figure 3:
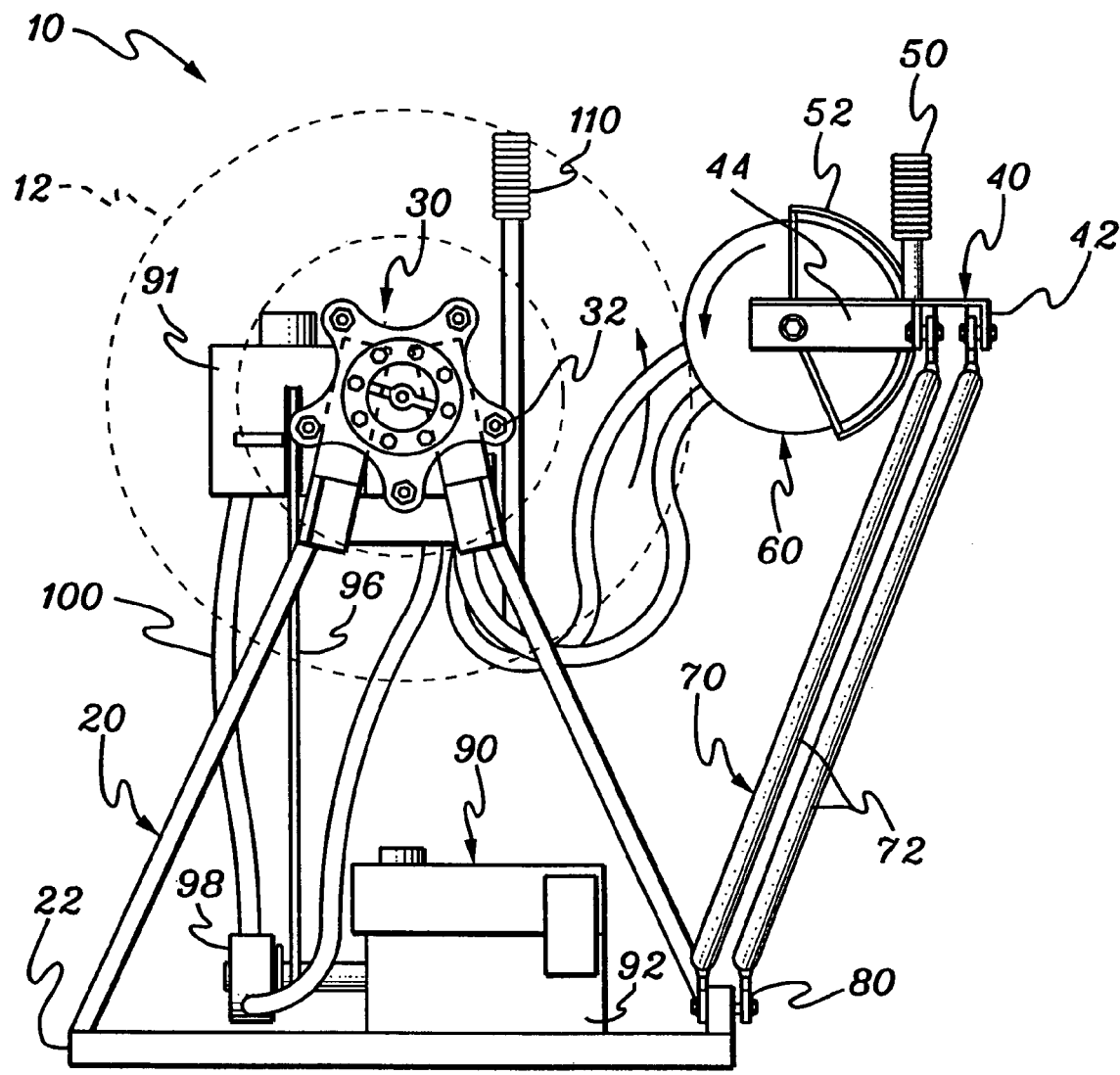
FIG. 3 is a side elevational view of the apparatus of FIG. 1.

As illustrated in FIGS. 1–3, apparatus 10 generally includes a stand 20, a rotatable tire mount 30 supported by the stand and releasably attachable to a tire 12 (shown in dashed lines), a rotatable hub mount 40 attachable to a texturizing hub 60 (FIG. 3), a support 70 which pivotally attaches stand 20 to hub mount 40, and a driver 90 operably connected to tire mount 30 and to hub mount 40 for rotating the tire and the texturizing hub.

Support 20 may be a frame structure having a bottom base 22 and an upper platform 24 (FIG. 2). The support may be formed from square metal tubing and welded together or formed from other suitable members and materials.

Tire mount 30 may include a plurality of lugs 32 to which a rim of a tire may be attached with lug nuts (not shown). Tire mount 30 is attached to an axel or spindle 34 (FIG. 2) with is supported by a bracket 36 (FIG. 2) at one end and by a gear reducer 38 at the other end. Instead of lug nuts, the end of the axel or spindle may be threaded and a rim of a tire may be secured to the axel using a single nut having a pair of outwardly-extending handles. It will be appreciated that other connectors such as a quick disconnect fitting may also be suitably employed to releasably attach the tire to the tire mount.

Rotatable hub mount 40 may include a U-shaped frame having a middle portion 42, and two legs 44 (only one of which is shown in FIG. 3). The U-shaped frame 42 may be suitably formed from members having a C- or angle-shaped cross-section. An axel (not shown) attaches to and spans between legs 44 for rotatably supporting texturizing hub 60. A pair of handles 50 may be provided which extending vertically upwardly from the U-shaped frame and disposed so that they are positioned at approximately waist height for an operator to grab. A cage 52 may extend over the texturizing hub to protect the operator. The cage may be formed from an expanded metal plate.

Figure 4:
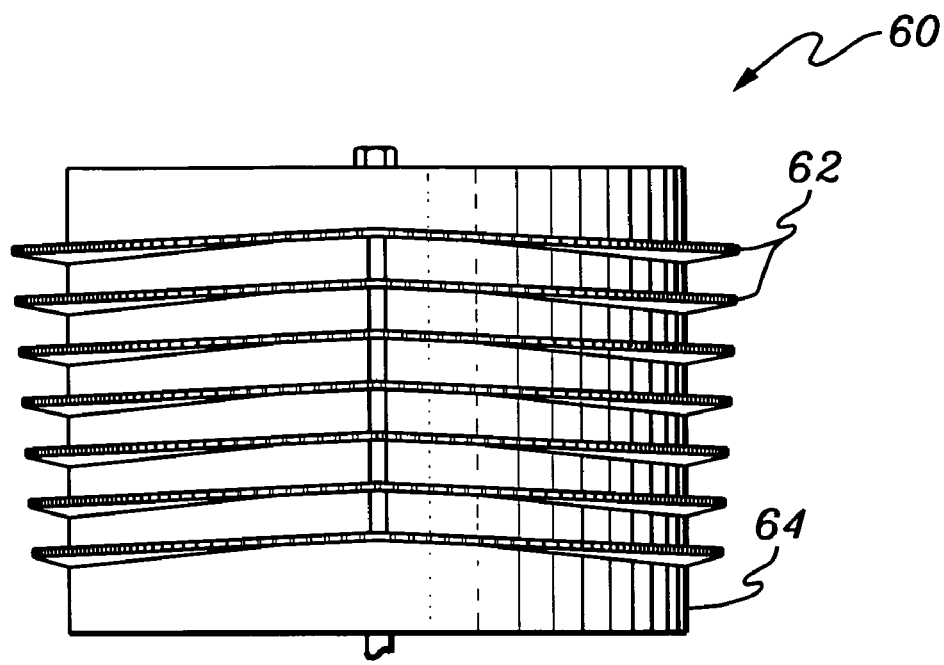
FIG. 4 is a plan view of one embodiment of the texturizing hub of the apparatus of FIG. 1.
Figure 5:
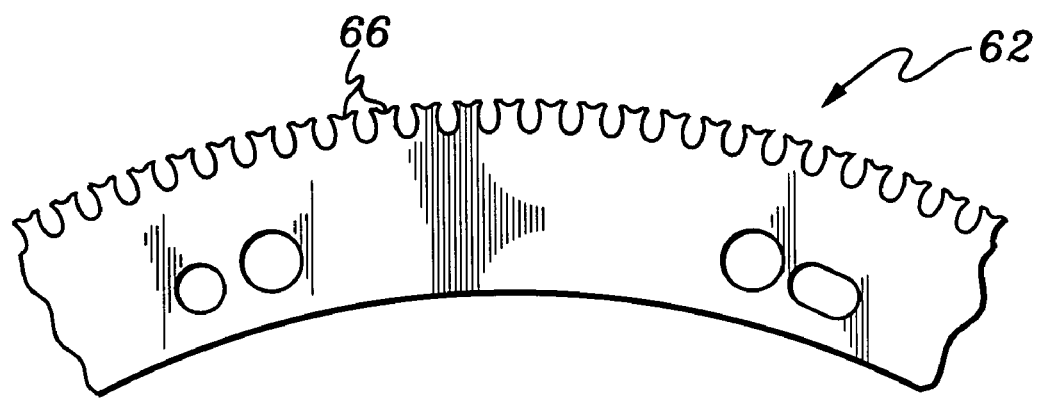
FIG. 5 is an elevational view of one of the blades of the texturizing hub of FIG. 4.

FIG. 4 illustrates one example of texturizing hub 60 having a plurality of spaced-apart blades 62 disposed sinusoidally around the solid surface of a hub 64. Blades 62, one of which is best shown in FIG 5, have a plurality of teeth 66 which extend about ⅜-inch from the surface of hub 64 as shown in FIG. 4. The texturizing hub may be a buffing rasp used in buffing machines to automatically remove the entire tread material when retreading tires. A suitable tire rasp for use in a tire buffing machine is described in U.S. Pat. No. 5,033,175 issued to Jensen, the entire subject matter of which is incorporated herein by reference. It will be appreciated that other texturizing hubs may be suitable for texturizing tread surfaces of tires as described below. For example, the texturizing hub may have a plurality of straight or parallel spaced-apart blades, a plurality of spaced-apart teeth, or other configurations, and formed from various materials.

With reference again to FIGS. 1–3, support 70 may include four bars 72 attached at their lower ends to stand 20 using hime joints 80, and at their upper ends to hub mount 40 also using hime joints 80 (FIG. 1). Support 70 pivotally attaches the hub mount to the stand so that an operator may manually guide the texturizing hub across the tread surfaces of the tire until proper texture is achieved as described below. From the present description, the ends of the bars may be attached using rubber bushings which allows for suitable movement of the texturizing hub by the operator.

With reference particularly to FIG. 1, the pair of handles 50 allow an operator to move the texturizing hub toward and away from the tread surface of the tire (as illustrated by arrow A), across the tread surface of the tire laterally from side-to-side (as illustrated by arrow B), and pivot the texturing hub or roll the texturizing hub around the outer edges of the tread surfaces of the tire (as illustrated by arrow C).

With reference again to FIGS. 1–3, driver 90 is positioned on base 22 of stand 20 and may include a motor 92 such as a 5½ horsepower gas engine or 1½ horsepower electric motor. Motor 92 may be operably connected to gear reducer 38 positioned on upper platform 24 (FIG. 2) of stand 20 via pulleys and a belt 96 which rotates axel or spindle 34 which is connected to tire mount 30. Motor 90 may also be attached to a hydraulic pump 98 (FIG. 3) which hydraulic pump is operably connected via hydraulic lines or hoses 93 (FIG. 2) to a junction box 94 (FIG. 2) which in turn is connected to a pair of hydraulic lines or hoses 95 (FIG. 2) to a hydraulic motor 97 (FIG. 2) for rotating the texturizing hub. The gear reducer may be a 6 to 1 gear reducer which drives and controls the speed of the tire mount to which the wheel and tire are mounted. A reservoir 91 for holding hydraulic fluid may be positioned on upper platform 24 and connected to hydraulic pump 98 via a hydraulic line 100 and to junction box 94 via one of the hoses 93.

A handle 110 (FIG. 2) may be provided for engaging and disengaging the rotation of the tire mount.

In operation, the apparatus may be configured so that the tire and the texturizing hub rotate in opposite directions. An operator of the apparatus is able to grip the handles and use his arms, legs, and/or body weight to manually move the texturizing hub which is supported and generally aligned with the tire into contact with the tire and apply pressure between the tread surfaces of the tire and the texturizing hub.

Figure 6:
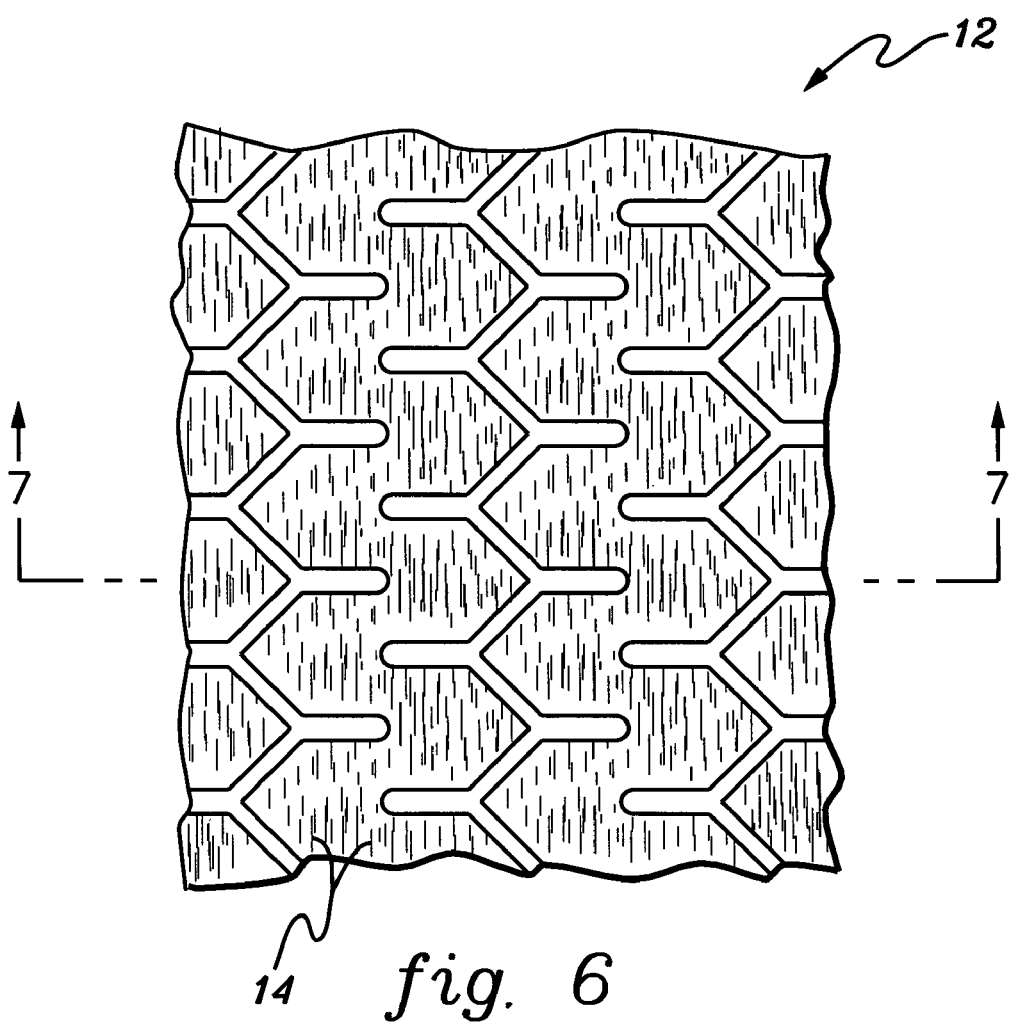
FIG. 6 is a partial plan view of the texturized tread surfaces of the tire using the apparatus of FIG. 1.
Figure 7:
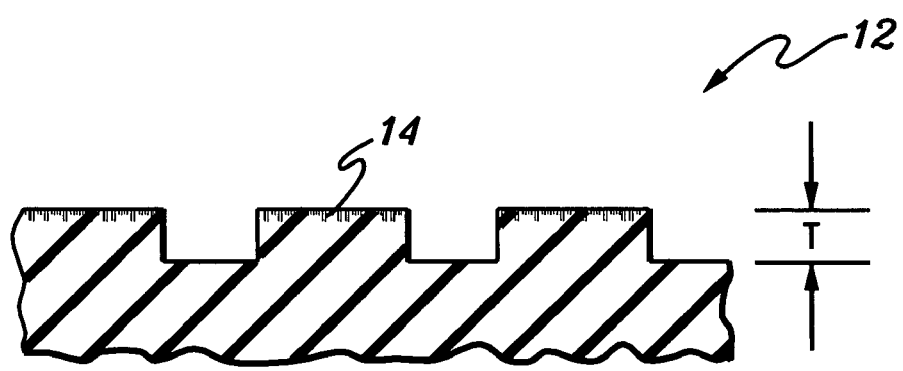
FIG. 7 is a plan view of the texturized tread surfaces of the tire taken along line 7—7 in FIG. 6.

The texturizing of the tire surface in accordance with the present invention does not include removing a layer from or reducing the thickness of the upper tread surfaces of the tire. Instead, the blades gouge, slice, and/or cut into the tread surfaces of the tire to a distance of about ¹⁄₃₂-inch to about ¹⁄₁₆-inch deep as best shown in FIGS. 6 and 7. The resulting slices and/or grooves 14 extend circumferentially along the tire, i.e., they do not extend across the width of the tire. The slices and/or grooves being in only one direction result in less lateral sliding of the tires during a race, and thus, better handling of the car and longer life of the tires. In addition, during the texturizing process, smoke is not produced, while small rubber shavings are removed from the tire. The texturizing process results in a high density of closely spaced pattern of slices and/or grooves across the surface of the tread.

As noted above, the slices and/or grooves may be formed in the treads while a portion of the top of the surface of the tread is maintained, i.e., the texturizing does not reduce the thickness T (FIG. 7) of the tire tread or remove the entire upper portion of the tire tread.

From the present description, it will be appreciated by those skilled in the art that further apparatus in accordance with the present invention may be configured or be comprised of other suitable components. For example, while apparatus 10 is configured so that the tire mount and the hub mount have horizontally-disposed axes of rotation, a vertical orientation or other orientations may be possible. The apparatus may include a pair of electric motors, one for rotating the tire and one for rotating the texturizing hub.

While various embodiments of the present invention have been illustrated and described, it will be appreciated to those skilled in the art that many changes and modifications may be made thereunto without departing from the spirit and scope of the invention.

The invention claimed is:

1. An apparatus for use by an operator for texturizing tread surfaces of a tire, said apparatus comprising:
   a stand;
   a tire mount supported by said stand and releasably attachable to the tire;
   a tire rasp;
   a tire rasp mount attachable to said tire rasp;
   a support for pivotally attaching said tire rasp mount to said stand, said support comprises a plurality of bars, each of said bars being pivotally attached at one end to said tire rasp mount and pivotally attached at the other end to said stand;
   a driver operably connected to said tire mount and to said tire rasp for rotating said tire mount and said tire rasp; and
   wherein the operator is able to manually move said tire rasp into contact with the tire and apply pressure between said tire rasp and the tire to texturize tread surfaces of the tire.

2. The apparatus of claim 1 wherein said plurality of bars comprises four bars, each of said bars being pivotally attached at one end to said tire rasp mount with hime joints and pivotally attached at the other end to said stand with hime joints.

3. The apparatus of claim 1 wherein said tire rasp is movable toward and away from the tread surfaces of the tire, across the tread surfaces of the tire, and around edges of the tread surfaces of the tire.

4. The apparatus of claim 1 wherein said tire rasp mount comprises a pair of handles.

5. The apparatus of claim 1 wherein said tire mount and said tire rasp rotate in opposite directions.

6. The apparatus of claim 1 wherein an axis of the tire and an axis of said tire rasp are disposed horizontally and parallel to each other.

7. The apparatus of claim 1 wherein said tire rasp comprises a plurality of spaced-apart blades.

8. The apparatus of claim 1 wherein said tire rasp comprises a plurality of spaced-apart blades sinusoidally disposed around the circumference of said tire rasp.

9. The apparatus of claim 1 wherein said tire mount comprises a plurality of lugs.

10. The apparatus of claim 1 wherein said driver comprises a gasoline engine operably connected for rotating said tire mount and said tire rasp.

11. The apparatus of claim 1 wherein said support comprises a cage extending around a portion of said tire rasp.

12. A manually operated portable apparatus for use by an operator to texturize tread surfaces of a tire, said apparatus comprising:
    a stand;
    a tire mount supported by said stand and releasably attachable to the tire;
    a texturizing hub;
    a hub mount attachable to said texturizing hub, said hub mount comprising a plurality of handles;
    a support for attaching said hub mount to said stand, said support comprising a plurality of bars, each of said bars being pivotally attached at one end to said hub mount and pivotally attached at the other end to said stand;
    a driver operably connected to said tire mount and to said texturizing hub for rotating said tire mount and said texturizing hub; and
    wherein the operator is able to grab said plurality of handles and manually move said texturizing hub into contact with the tire and apply pressure between said texturizing hub and the tire to texturize tread surfaces of the tire.

13. The apparatus of claim 12 wherein said texturizing hub is movable toward and away from the tread surfaces of the tire, across the tread surfaces of the tire, and around edges of the tread surfaces of the tire.

14. The apparatus of claim 13 wherein said plurality of bars comprises four bars, each of said bars being pivotally attached at one end to said hub mount with hime joints and pivotally attached at the other end to said stand with hime joints.

15. The apparatus of claim 14 wherein said texturizing hub comprises a tire rasp having a plurality of spaced-apart blades.

16. A manually operated portable apparatus for use by an operator to texturize tread surfaces of a tire, said apparatus comprising:
    a stand;
    a tire mount supported by said stand for supporting the tire about a first horizontally-disposed axis of rotation;
    a texturizing hub;
    a hub mount for rotatably supporting said texturizing hub about a second horizontally-disposed axis of rotation, said hub mount comprising a pair of vertically-extending handles;
    a support for attaching said hub mount to said stand, said support comprising a plurality of bars, each of said bars being pivotally attached at one end to said hub mount and pivotally attached at the other end to said stand;
    a driver operably connected to said tire mount and to said texturizing hub for rotating said tire mount and said texturizing hub; and
    wherein said handles are disposed at waist height and wherein the operator is able to grab said pair of handles and manually move said texturizing hub into contact with the tire and apply pressure between said texturizing hub and the tire to texturize tread surfaces of the tire.

17. The apparatus of claim 16 wherein said texturizing hub is movable toward and away from the tread surfaces of the tire, across the tread surfaces of the tire, and around edges of the tread surfaces of the tire.

18. The apparatus of claim 17 wherein said plurality of bars comprises four bars, each of said bars being attached pivotally attached at one end to said hub mount with hime joints and pivotally attached at the other end to said stand with hime joints.

19. The apparatus of claim 18 wherein said texturizing hub comprises a tire rasp having a plurality of spaced-apart blades.

20. An apparatus for use by an operator for texturizing tread surfaces of a tire, said apparatus comprising:
    a stand;
    tire mount means supported by said stand for supporting the tire;
    texturizing means for at least one of slicing and gouging;
    hub mount means for rotatably supporting said texturizing means;
    support means for pivotally attaching said texturizing means to said stand so that said texturizing means is movable toward and away from the tread surfaces of the tire, across the tread surfaces of the tire, and around edges of the tread surfaces of the tire, said support means comprising a plurality of bars, each of said bars being pivotally attached at one end to said tire mount means and pivotally attached at the other end to said stand; and drive means operably connected to said tire mount means and to said texturizing means for rotating said tire mount means and said texturizing means.

21. A method for texturizing tread surfaces of a tire, the method comprising:
providing a manually operated portable apparatus comprising:
a stand;
a tire mount supported by said stand and releasably attachable to the tire;
a texturizing hub;
a hub mount attachable to said texturizing hub, said hub mount comprising a plurality of handles;
a support for attaching said hub mount to said stand, said support comprising a plurality of bars, each of said bars being pivotally attached at one end to said hub mount and pivotally attached at the other end to said stand;
a driver operably connected to said tire mount and to said texturizing hub for rotating said tire mount and said texturizing hub; and
wherein the operator is able to grab said plurality of handles and manually move said texturizing hub into contact with the tire and apply pressure between said texturizing hub and the tire to texturize tread surfaces of the tire; and
operating the apparatus to form a plurality of at least one of slices and grooves circumferentially around portions of the tread surfaces of the tire.

22. The method of claim 21 wherein the operating comprises operating the apparatus to form the plurality of the at least one of slices and grooves about $\frac{1}{32}$-inch to about $\frac{1}{16}$-inch deep while maintaining the thickness of the tread.

23. The method of claim 21 wherein said texturizing hub comprises a tire rasp.

24. The method of claim 21 wherein said plurality of bars comprises four bars, each of said bars being pivotally attached at one end to said hub mount with hime joints and pivotally attached at the other end to said stand with hime joints.

25. The method of claim 21 wherein said texturizing hub is movable toward and away from the tread surfaces of the tire, across the tread surfaces of the tire, and around edges of the tread surfaces of the tire.

26. A method for texturizing tread surfaces of a tire, the method comprising:
providing a manually operated portable comprising:
a stand;
a tire mount supported by said stand for supporting the tire about a first horizontally-disposed axis of rotation;
a texturizing hub;
a hub mount for rotatably supporting said texturizing hub about a second horizontally-disposed axis of rotation, said hub mount comprising a pair of vertically-extending handles;
a support for attaching said hub mount to said stand, said support comprising a plurality of bars, each of said bars being pivotally attached at one end to said hub mount and pivotally attached at the other end to said stand;
a driver operably connected to said tire mount and to said texturizing hub for rotating said tire mount and said texturizing hub; and
wherein said handles are disposed at waist height and wherein the operator is able to grab said pair of handles and manually move said texturizing hub into contact with the tire and apply pressure between said texturizing hub and the tire to texturize tread surfaces of the tire; and
operating the apparatus to form a plurality of at least one of slices and grooves circumferentially around portions of the tread surfaces of the tire.

27. The method of claim 26 wherein the operating comprises operating the apparatus to form the plurality of the at least one of slices and grooves about $\frac{1}{32}$-inch to about $\frac{1}{16}$-inch deep while maintaining the thickness of the tread.

28. The method of claim 26 wherein said texturizing hub comprises a tire rasp.

29. The method of claim 26 wherein said plurality of bars comprises four bars, each of said bars being pivotally attached at one end to said hub mount with hime joints and pivotally attached at the other end to said stand with hime joints.

30. The method of claim 26 wherein said texturizing hub is movable toward and away from the tread surfaces of the tire, across the tread surfaces of the tire, and around edges of the tread surfaces of the tire.

31. A method for texturizing tread surfaces of a tire, the method comprising:
providing an apparatus comprising:
a stand;
tire mount means supported by said stand for supporting the tire;
texturizing means for at least one of slicing and gouging;
hub mount means for rotatably supporting said texturizing means;
support means for pivotally attaching said texturizing means to said stand so that said texturizing means is movable toward and away from the tread surfaces of the tire, across the tread surfaces of the tire, and around edges of the tread surfaces of the tire, said support means comprising a plurality of bars, each of said bars being pivotally attached at one end to said tire mount means and pivotally attached at the other end to said stand; and
drive means operably connected to said tire mount means and to said texturizing means for rotating said tire mount means and said texturizing means; and
operating the apparatus to form a plurality of at least one of slices and grooves circumferentially around portions of the tread surfaces of the tire.

32. The method of claim 31 wherein the operating comprises operating the apparatus to form the plurality of the at least one of slices and grooves about $\frac{1}{32}$-inch to about $\frac{1}{16}$-inch deep while maintaining the thickness of the tread.

33. The method of claim 31 wherein said plurality of bars comprises four bars, each of said bars being pivotally attached at one end to said hub mount means with hime joints and pivotally attached at the other end to said stand with hime joints.

34. The method of claim 31 wherein said tire rasp is movable toward and away from the tread surfaces of the tire, across the tread surfaces of the tire, and around edges of the tread surfaces of the tire.

* * * * *